UNITED STATES PATENT OFFICE.

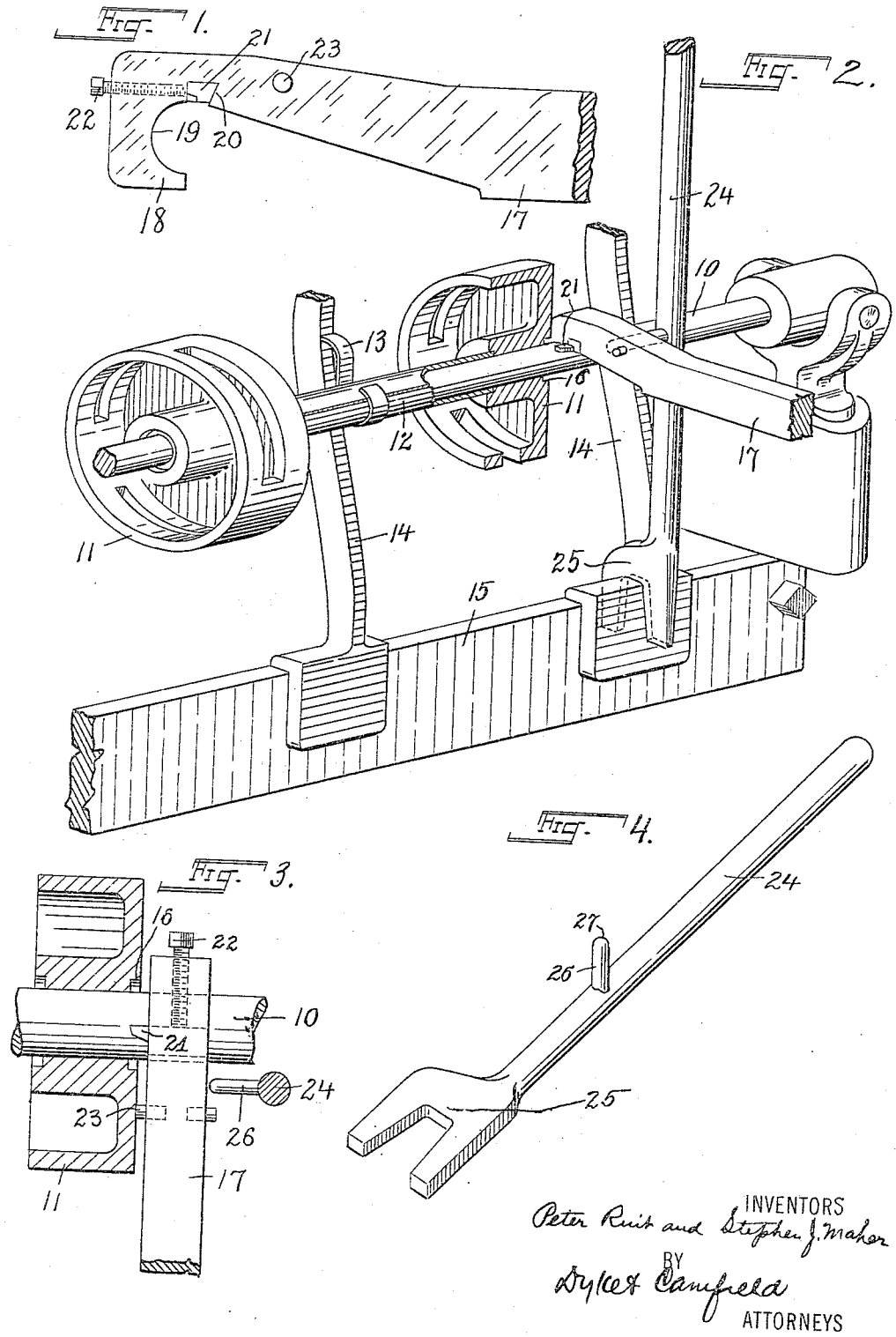

PETER RUIT, OF HAWTHORNE, AND STEPHEN J. MAHER, OF PATERSON, NEW JERSEY, ASSIGNORS TO HENRY J. TYNAN, OF PATERSON, NEW JERSEY.

CUTTING-TOOL.

1,243,449.      Specification of Letters Patent.      Patented Oct. 16, 1917.

Application filed September 20, 1916. Serial No. 121,103.

*To all whom it may concern:*

Be it known that we, PETER RUIT and STEPHEN J. MAHER, citizens of the United States, and residents of Hawthorne, county of Passaic, and State of New Jersey, and Paterson, county of Passaic, and State of New Jersey, respectively, have invented certain new and useful Improvements in Cutting-Tools, of which the following is a specification.

Our invention relates to a cutting tool and more particularly to a cutting tool designed for making cuts, such as grooves, in pulleys and the like while in place on a shaft.

In the patent of Henry J. Tynan, No. 1,153,467, granted September 14, 1915, is disclosed a sleeve for surrounding a rotary shaft and held stationary by proper means to prevent the winding up of threads and the like upon the shaft, and especially at points where pulleys or other rotating devices are fastened to the shaft. In applying such sleeves to machinery comprising long shafts and large numbers of rotating members, as pulleys spaced along such shafts, we have found that such protecting sleeves are most effective when their ends are let into the pulleys for a short distance, as by cutting a suitable groove therein.

To follow the ordinary course, however, in such work, involving taking down of machines, such as spinning machines, centering of pulleys in lathes after being removed from the machine, and making cuts with lathe tools, many difficulties are encountered, including the expense and trouble of taking down and reassembling machines and lack of uniformity in the grooves cut by tools set for single pulleys, all of which involves a great expense and loss of time, and during such operation, and during the time that the machines are being taken down and reassembled, they are out of commission and production is at a standstill.

We have devised a cutting tool which obviates these various difficulties, and by means of which grooves may be cut and other cuts made in rotating members on a shaft with the shaft in place in its usual position, and this may be done with the expenditure of very little time and trouble and with no loss at all such as is incident to the taking down and reassembling of the machines and doing of the work in separate apparatus, as in lathes. In fact it is possible to carry on such operation without any loss of time for the machine at all, as the work can be done at times when the machines are not in use. The cutting tool, with slight variations in form, may be used for making cuts other than grooves, as for reducing the width of members, as pulleys and the like, in place on a shaft, etc., etc.

It is to be understood that while we have illustrated and shall describe our invention as applied to spinning machines, it is not limited to any particular machine, but is generally applicable on all machines or devices in which cuts are to be made in rotary members while in place upon the shaft.

In the accompanying drawings we have illustrated the invention as applied to cutting grooves in the pulleys of a spinning machine. In said drawings Figure 1 is a side view of the cutting tool. Fig. 2 is a view partly in perspective and partly in cross section and illustrating the use of the cutting tool on a spinning machine. Fig. 3 is a sectional detail view showing the relation of the cutting tool to the shaft and pulley, and Fig. 4 is a view in perspective of a pusher for applying sidewise pressure to the cutting tool while in use.

In said drawings reference character 10 designates the shaft of a machine to be operated upon, which in this instance is shown as a portion of a spinning machine, and the rotating members secured thereto, in this case the pulleys, are designated by 11. The reference character 12 designates a protecting sleeve for the shaft 11, such as disclosed in the patent to Tynan above referred to, and having a clamp or other projecting member 13 holding such sleeve against rotation by contact with any adjacent stationary object. Such contact in the form shown is against one of the upright machine members 14 which are secured to a rail 15 and form parts of the spinning machines. The sleeves 12 are preferably received in grooves 16 in the pulleys 11, and when so received in such grooves are more efficient in preventing the winding up of threads and the clogging of the machine with material wound about the shaft 10.

In order to cut the grooves 16 in the members 11, we provide a tool which may be hooked over the shaft 10 and is adapted to cut the grooves 16 in the pulleys 11 *in situ*, that is, without the machine being disassembled or taken down and with all the parts in their usual positions. Such cutting tool is designated generally by the reference character 17 and may be of any suitable shape, but preferably has the form of a bar and is provided with a hook 18 having a part-circular portion 19 adapted to fit preferably closely about the shaft 10. Means for holding a cutting knife in the bar 17 are provided, and in the form shown a slot 20 extends transversely through the bar 17 at one side of the cut-out 19. Said slot is preferably of substantially the dove-tailed form shown, and in said slot is received a cutting knife 21 which may be held in place by any suitable means, as by a set-screw 22. The cutting knife 21 projects laterally beyond the member 17 and in a direction substantially parallel to the axis of the hook in said member, or, in other words, when the tool is in place on a shaft, substantially parallel to the axis of the shaft. Suitable means for gaging the depth of the cut are provided, and the same may consist of a stop pin 23 adapted to contact with the pulleys 11, when the groove 16 has been cut to the proper depth, and prevent further cutting.

Means are preferably provided for holding the tool up to the rotating member, as the pulley 11, in which the groove or other cut is to be made. A lever may be used for such purpose, and we may provide various types of holding levers, according to the character of the machine in which the groove or other cutting is being carried on. In the form shown the lever 24 has a forked end 25 which is adapted to straddle the base bar 15 of the machine and to be received against one of the uprights 14, and the lever 24 is also provided with means to press against the tool 17 and hold the same up to its work, such means consisting, in the form shown, of a stud 26 with a rounded end 27 permitting the bar 16 to be pushed up to its work in various angular positions which may be assumed by the lever 24 as the cutting proceeds. By straddling the base bar the pusher lever 24 is prevented from twisting.

The operation of the apparatus described will be readily understood from the foregoing. To cut grooves in rotary members mounted on shafts, for which work the tool shown is particularly adapted, the tool 17 is hooked over the shaft adjacent to the member in which the groove is to be cut, the hook 18 fitting about the shaft, and is pushed up to the rotary member in which the groove is to be cut by applying sidewise pressure on the tool 17, through the intervention of a suitable lever or otherwise, and as soon as the groove has been cut to the proper depth, further cutting is prevented by the stop member provided for that purpose. While the cutting knife, in the form shown, cuts grooves on the left hand side of the tool, it will be understood that the parts may be readily reversed, or a separate similar tool provided with the cutting knife projecting in the opposite way, so that grooves may be cut in both sides of the members to be grooved, and by slight changes in the form of tool, a variety of cuts other than grooves may be made without removing the rotary member to be cut from its shaft.

It is to be understood that the drawings appended hereto are for the purpose of illustration only and that, within the scope of the claims devices embodying our invention may be changed in numerous respects from the particular form shown, without departing from our invention or sacrificing any of its advantages, and that the same may be used on any machinery or other apparatus where cuts are to be made in or on members on rotating shafts without removal from the shaft and, in the case of grooves, whether for the accommodation of sleeves for protecting the shafts from winding up threads or the like thereon, or for other purposes.

Having thus described our invention, we claim:

1. A bar having a hook formed thereon to hook over a shaft and having a slot adjacent to the hook, and a cutter in said slot and projecting substantially parallel to the axis of the hook.

2. A member provided with a hook, a cutter adjacent to the hook and projecting substantially parallel to the axis of the hook, and a stop member for limiting the action of the cutter.

3. A bar having a hook formed thereon and having a slot adjacent to the hook, a cutter in said slot and projecting substantially parallel to the axis of the hook, and a stop pin on said bar to limit the depth of the cut.

4. A member provided with a hook and a cutting knife adjacent to the hook, and means for pushing said member and cutting knife toward an object to be cut.

5. A bar having a hook formed thereon to hook over a shaft, a cutting knife projecting laterally from said bar, and a lever for pushing said bar along said shaft and said cutting knife against an object to be cut rotating with the shaft.

In testimony that we claim the foregoing, we have hereto set our hands, this 14th day of September 1916.

PETER RUIT.
STEPHEN J. MAHER.